US010539155B2

(12) United States Patent
Chanez

(10) Patent No.: US 10,539,155 B2
(45) Date of Patent: Jan. 21, 2020

(54) PROPULSIVE ASSEMBLY FOR AIRCRAFT COMPRISING A TURBOJET FITTED WITH A FAN WITH REMOVABLE BLADES

(71) Applicant: SAFRAN AIRCRAFT ENGINES, Paris (FR)

(72) Inventor: Philippe Gérard Chanez, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 395 days.

(21) Appl. No.: 15/335,581

(22) Filed: Oct. 27, 2016

(65) Prior Publication Data
US 2017/0114799 A1 Apr. 27, 2017

(30) Foreign Application Priority Data
Oct. 27, 2015 (FR) ...................................... 15 60231

(51) Int. Cl.
| | |
|---|---|
| *F04D 29/34* | (2006.01) |
| *F04D 29/64* | (2006.01) |
| *B64D 27/16* | (2006.01) |
| *F02K 3/06* | (2006.01) |
| *F04D 29/38* | (2006.01) |

(Continued)

(52) U.S. Cl.
CPC ........... *F04D 29/646* (2013.01); *B64D 27/16* (2013.01); *F01D 5/3007* (2013.01); *F02K 3/06* (2013.01);
(Continued)

(58) Field of Classification Search
CPC ...... F01D 5/3007; F04D 29/322; F04D 29/34; F04D 29/646
See application file for complete search history.

(56) References Cited

U.S. PATENT DOCUMENTS 1,719,415 A * 7/1929 Back .................... F01D 5/3007
  416/216
5,067,876 A * 11/1991 Moreman, III ....... F01D 5/3007
  416/219 R
(Continued)

FOREIGN PATENT DOCUMENTS

| EP | 2 090 751 A1 | 8/2009 | |
|---|---|---|---|
| EP | 2090751 A1 * | 8/2009 | ............... F01D 5/30 |

(Continued)

OTHER PUBLICATIONS

English machine translation of specification from EP 2090751 A1.*
Search Report as issued in French Patent Application No. 1560231, dated Sep. 5, 2016.

*Primary Examiner* — Dwayne J White
*Assistant Examiner* — Wesley Le Fisher
(74) *Attorney, Agent, or Firm* — Pillsbury Winthrop Shaw Pittman LLP

(57) ABSTRACT

A propulsive assembly for an aircraft includes a nacelle and a turbojet. The nacelle includes an upstream air inlet section. The turbojet includes a fan with removable blades. The air inlet section extends longitudinally. The fan includes a rotary disk including an annular peripheral wall and a plurality of curvilinear recesses positioned circumferentially in the wall. Each blade includes a blade body extending between a blade root and a blade head in a blade axis which is roughly radial relative to a fan rotation axis. Each blade root includes a curvilinear attachment housed in a respective recess of the rotary disk. Each attachment has a support surface forming an arc. The function of the support surface is to hold the attachment in the recess. The arc extends in or parallel to an attachment plane containing the blade axis or forming with the blade axis an angle of less than 15°.

6 Claims, 4 Drawing Sheets

(51) Int. Cl.
    *F01D 5/30*     (2006.01)
    *F04D 29/32*     (2006.01)

(52) U.S. Cl.
    CPC ............ *F04D 29/322* (2013.01); *F04D 29/34* (2013.01); *F04D 29/38* (2013.01); *F05D 2220/323* (2013.01); *F05D 2220/36* (2013.01); *F05D 2230/60* (2013.01); *F05D 2250/71* (2013.01)

(56) References Cited

U.S. PATENT DOCUMENTS

| | | | |
|---|---|---|---|
| 9,739,158 B2* | 8/2017 | Rivers | F01D 5/14 |
| 2004/0062651 A1* | 4/2004 | Suciu | F01D 5/141 |
| | | | 416/219 R |
| 2009/0214351 A1* | 8/2009 | Guo | B23C 3/34 |
| | | | 416/219 R |
| 2012/0014802 A1* | 1/2012 | Krikunov | F01D 5/3007 |
| | | | 416/219 R |
| 2015/0202707 A1* | 7/2015 | Cook, III | B23K 1/0018 |
| | | | 416/230 |
| 2016/0061057 A1* | 3/2016 | Lord | F01D 5/141 |
| | | | 415/122.1 |
| 2017/0107999 A1* | 4/2017 | Fanton | B23P 15/006 |

FOREIGN PATENT DOCUMENTS

| | | |
|---|---|---|
| EP | 2 407 637 A2 | 1/2012 |
| FR | 976 790 A | 3/1951 |
| FR | 2 660 361 A1 | 10/1991 |
| FR | 2 903 154 A1 | 1/2008 |

\* cited by examiner

PROPULSIVE ASSEMBLY FOR AIRCRAFT COMPRISING A TURBOJET FITTED WITH A FAN WITH REMOVABLE BLADES

CROSS-REFERENCE TO RELATED APPLICATIONS

This application claims priority to French Patent Application No. 1560231, filed Oct. 27, 2015, the entire content of which is incorporated herein by reference in its entirety.

TECHNICAL FIELD OF THE INVENTION

The invention relates to a removable fan blade for an aircraft turbojet, and to a rotary fan disk on which such a blade can be installed.

TECHNOLOGICAL BACKGROUND OF THE INVENTION

An aircraft turbojet is generally positioned in an external shell called a "nacelle". A partial schematic longitudinal section view of a conventional arrangement of a fan with removable blades in a nacelle is illustrated in FIG. 1. The nacelle of the turbojet contains an air inlet upstream section 110, which is extended downstream by a section 120 including a casing 121 called the fan casing, intended to surround a fan of the turbojet. The fan includes a blade assembly which contains a plurality of blades 140.

The role of air inlet section 110 is to capture the air intended to feed the turbojet, whilst ensuring optimum air flow as far as an inlet plane of the fan. In particular, the air must be decelerated as far as the fan's inlet plane. For example, during cruising, the Mach number thus changes from 0.8 in outside conditions to 0.6 in the area of the fan's inlet plane. To accomplish this, air inlet section 110 has a curving internal wall 111 extending longitudinally as far as fan casing 121.

The turbojet's fan includes a rotary disk 130, the periphery of which contains a plurality of recesses 131. Each blade 140 of the fan includes an attachment 141 housed in one of recesses 131 of disk 130. Attachment 141 of a conventional blade 140 is generally rectilinear, but there are also blades with a curvilinear attachment which have a curvature in a plane tangential to the periphery of disk 130.

Document FR 2903154 A1 describes an example of an installation of a fan blade where each blade has a curvilinear attachment with a curvature in a plane tangential to the periphery of the disk.

To remove a blade 140 of the fan in the conventional manner, a cone 150 located upstream from disk 130 of the fan is removed beforehand, as illustrated in FIG. 1. A shim positioned in recess 131 of disk 130, between attachment 141 of blade 140 and the base of recess 131, is then removed. Blade 140 is then moved radially by a certain height permitted by removing the shim, and blade 140 is then disengaged from recess 131 by sliding attachment 141 longitudinally in recess 131. In this manner, blade 140 is removed by passing through air inlet section 110 without coming into contact with it.

However, the current trend is towards an increase of the rate of dilution of turbofans, also called the BPR (By-Pass Ratio). The rate of dilution is equal to the ratio between the flow rate of the secondary stream and the flow rate of the primary stream of the air in the turbojet. To increase the rate of dilution the diameter of the nacelle is increased, which has disadvantages, such as increased nacelle mass and drag.

The design of the nacelle is then revised to reduce the impact of these disadvantages. With this aim, the length of the air inlet section is reduced. The term "short" air inlet section is then used. A partial schematic longitudinal section view of an example of a nacelle containing a short air inlet section is illustrated in FIG. 2.

Despite a shorter length, air inlet section 110 must keep the same capacity to provide an optimum air flow as far as the fan's inlet plane. To accomplish, inner wall 111 of air inlet section 110 penetrates further under casing 121 surrounding the fan.

In this configuration, inner wall 111 prevents a blade 140 of the fan from being removed. Indeed, the space is insufficient to remove completely attachment 141 of blade 140 from recess 131 of disk 130, since blade 140 comes into contact with inner wall 111 before it can be removed completely.

It is then necessary to remove air inlet section 110 of the nacelle in order that blade 140 is able to be disengaged longitudinally. However, this solution has the disadvantage that it is extremely time-consuming due to the presence of many devices in air inlet section 110 of the nacelle, for example de-icing systems.

SUMMARY OF THE INVENTION

The invention seeks to resolve the problems which have just been described by proposing a removable fan blade and a rotary fan disk where the blade can be removed without any need to remove a part of the nacelle.

The invention relates to a propulsive assembly for aircraft including a nacelle and a turbojet positioned in the nacelle, where the nacelle contains an upstream air inlet section, where the turbojet includes a fan with removable blades positioned downstream from the air inlet section, where the air inlet section extends longitudinally over a length of less than 0.6 times a diameter of the fan, where the fan includes a rotary disk including an appreciably annular peripheral wall and a plurality of curvilinear recesses positioned circumferentially in the peripheral wall, where each blade includes a blade body extending between a blade root and a blade head in a roughly radial blade axis relative to an axis of rotation of the fan, where each blade root includes a curvilinear attachment housed in a respective recess of the rotary disk, where the shape of the recesses is complementary to that of the attachments, where each attachment has at least one support surface forming an arc, where the function of the support surface is, in particular, to hold the attachment in the recess, and where the arc extends in or parallel to an attachment plane containing the blade axis, or forming with the blade axis an angle of less than 15°.

Thanks to the invention, the attachment of the blade is disengaged from the disk's recess by a rotary sliding motion of the attachment in the recess. The rotary sliding is accomplished in the direction of the disk's axis of rotation. Thus, while a blade of the fan is being removed, the head of the blade describes a curve directed towards the interior of the nacelle, i.e. the head of the blade approaches the central axis of the nacelle. The blade is removed without coming into contact with the nacelle.

The propulsive assembly according to the invention can also have one or more characteristics from among the following ones, considered individually or according to the technically possible combinations:

the arc has a centre of curvature which is located in a first mid-plane perpendicular to the attachment plane, and containing the blade axis;

the arc is symmetrical relative to the first mid-plane;

the arc has a centre of curvature located at a distance from a first mid-plane perpendicular to the attachment plane, and containing the blade axis, where the centre of curvature is located, relative to the first mid-plane, on an identical downstream side as a trailing edge of the blade.

BRIEF DESCRIPTION OF THE FIGURES

The invention and its various applications will be better understood on reading the description which follows, and on examining the figures which accompany it, among which.

The figures are presented as an indication only, and are not restrictive of the invention in any manner.

For greater clarity, identical or similar elements are identified by identical reference signs in all the figures.

DETAILED DESCRIPTION OF AN EMBODIMENT OF THE INVENTION

One object of the invention is, in particular, to propose a blade and a disk equipping a fan of a turbojet positioned in a nacelle. The turbojet and the nacelle form a propulsive assembly of an aircraft. The invention seeks to facilitate the removal of the blade, without any requirement to disassemble the nacelle. Such a blade enables time to be gained during the procedure to remove the blade, and thereby to respond to increasingly demanding operational constraints.

Figure 1:
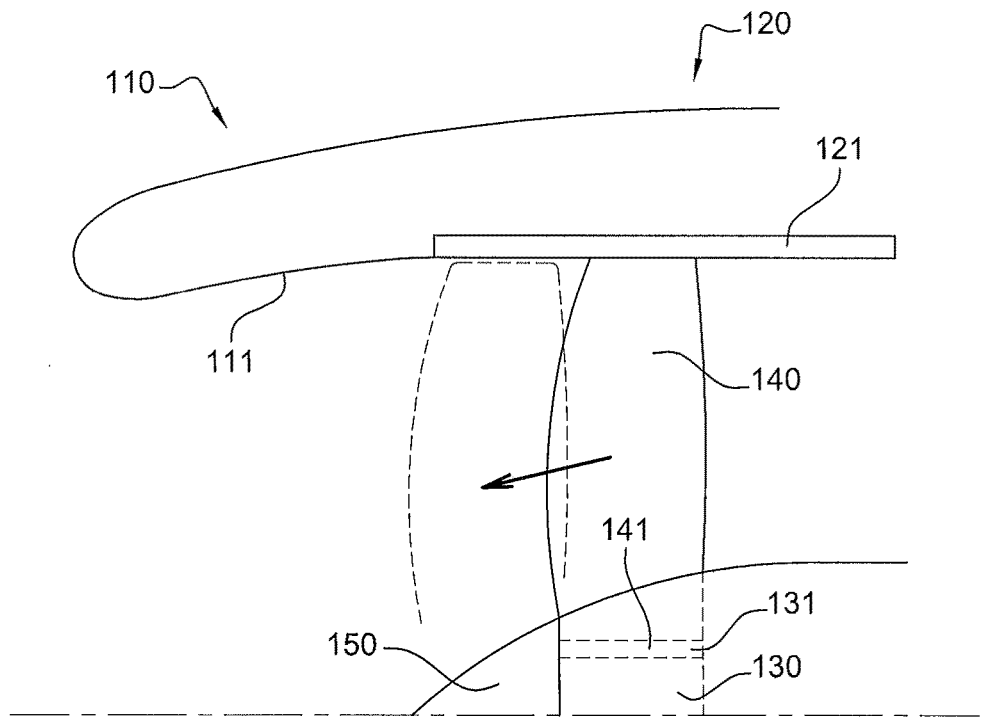
FIG. 1 is a partial schematic longitudinal section view of a first example of a nacelle including a short air inlet section having a conventional configuration according to the prior art.
Figure 2:
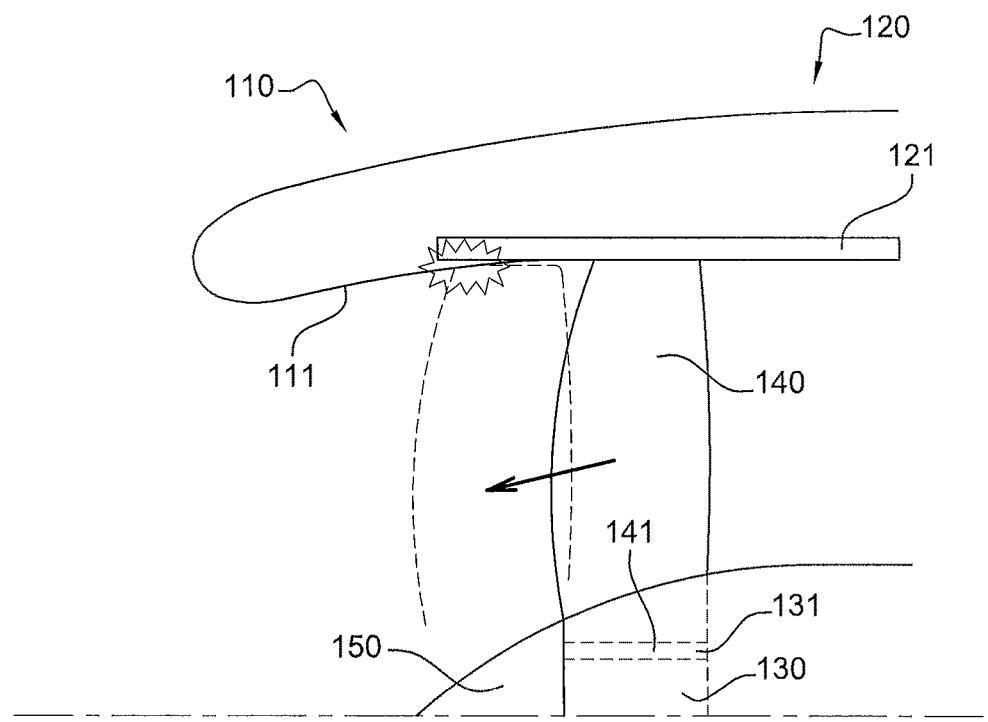
FIG. 2 is a partial schematic longitudinal section view of a second example of a nacelle including a short air inlet section according to the prior art.
Figure 3A:
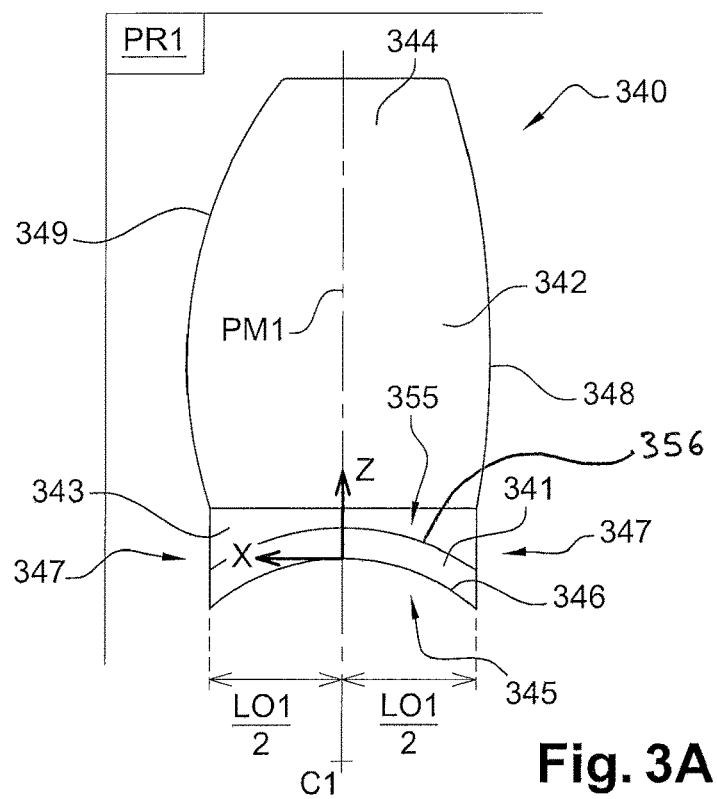
FIG. 3A is a schematic longitudinal section view of an embodiment of a blade according to the invention.
Figure 3B:
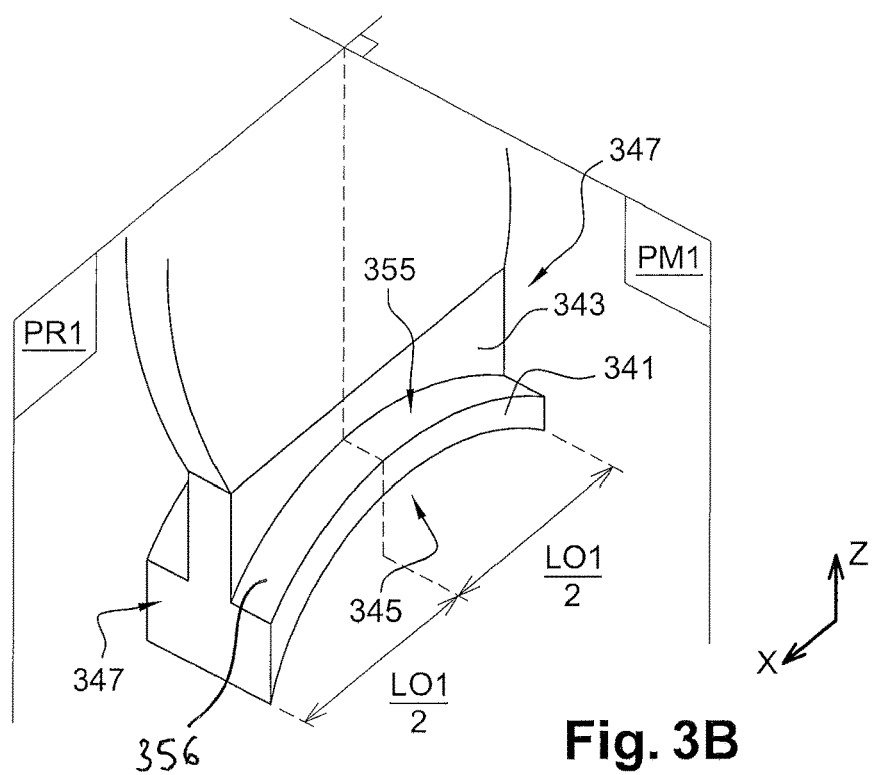
FIG. 3B is a partial schematic perspective view of the blade of FIG. 3A.

FIGS. 3A and 3B represent a removable fan blade 340 according to one embodiment of the invention. Blade 340 includes a blade body 342 extending three-dimensionally between a blade root 343 and blade head 344 and having a trailing edge 348 and a leading edge 349. A blade axis Z is defined as the right angle passing through the middle of the chord of the blade body in the vicinity of the blade root, and through the middle of the chord in the blade head. The chord is defined conventionally as a line segment linking a point of the trailing edge to a point of the leading edge. When blade 340 is installed on a rotary fan disk, the direction of blade axis Z is generally roughly radial relative to the rotational axis of the disk. However, depending on the three-dimensional shape of blade body 342, blade axis Z may form, relative to a radial direction, an angle of up to some ten degrees.

Blade root 343 includes a curvilinear attachment 341 intended to be inserted in a curvilinear recess of the fan disk, where the recess and attachment 341 have complementary shapes. Curvilinear attachment 341 has a first support surface 345 and at least one second support surface 355, the function of which, in particular, is to hold curvilinear attachment 341 in the recess. In this embodiment, first support surface 345 and second support surface 355 both form arcs 346, 356. In this case, first support surface 345 has a concave shape, and second support surface 355 has a convex shape.

Support surfaces 345, 355 of attachment 341 each form a cylinder portion extending between two faces 347 of attachment 341. First support surface 345 is located at one end of blade 340 and is able to come into contact with the base of the disk's recess. Second support surface 355 can include two portions positioned either side of blade body 342, as illustrated in FIG. 3B, or a single portion positioned on one side or the other of blade body 342. Second support surface 355 is able to come into contact with at least one surface opposite the base of the recess.

Arcs 346, 356, formed by support surfaces 345, 355, extend in or parallel to an attachment plane PR1 containing blade axis Z or forming an angle of less than 15° with blade axis Z. It should be noted, by comparison, that in the known device of document FR 2903154 A1, a curvilinear attachment of a blade has a curvature in an attachment plane roughly tangential to the periphery of the disk, i.e. in such a prior art the attachment plane forms an angle close to 90° with the blade axis.

Arcs 346, 356 preferably each has a centre of curvature located in a first mid-plane PM1 perpendicular to attachment plane PR1, and containing blade axis Z. In this embodiment, arcs 346, 356 have roughly the same centre of curvature C1. Both faces 347 of attachment 341, i.e. the upstream face (on the side of leading edge 349) and the downstream face (on the side of trailing edge 348), are separated by a length LO1 equal to chord LO1 of arc 346 formed by first support surface 345 of attachment 341. Mid-plane PM1 passes roughly through the middle of chord LO1 of arc 346.

According to the embodiment represented in FIGS. 3A and 3B, arcs 346, 356 are roughly symmetrical relative to first mid-plane PM1.

Figure 4A:
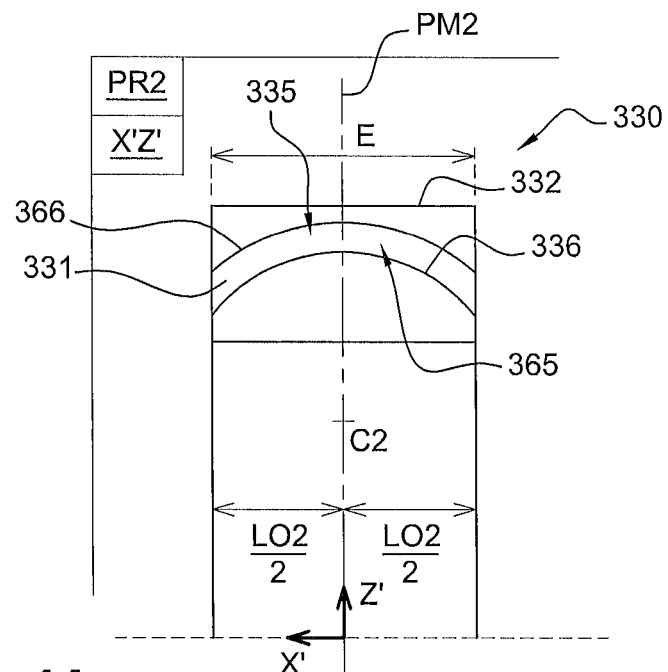
FIG. 4A is a partial schematic meridian section view of an embodiment of a disk according to the invention.
Figure 4B:
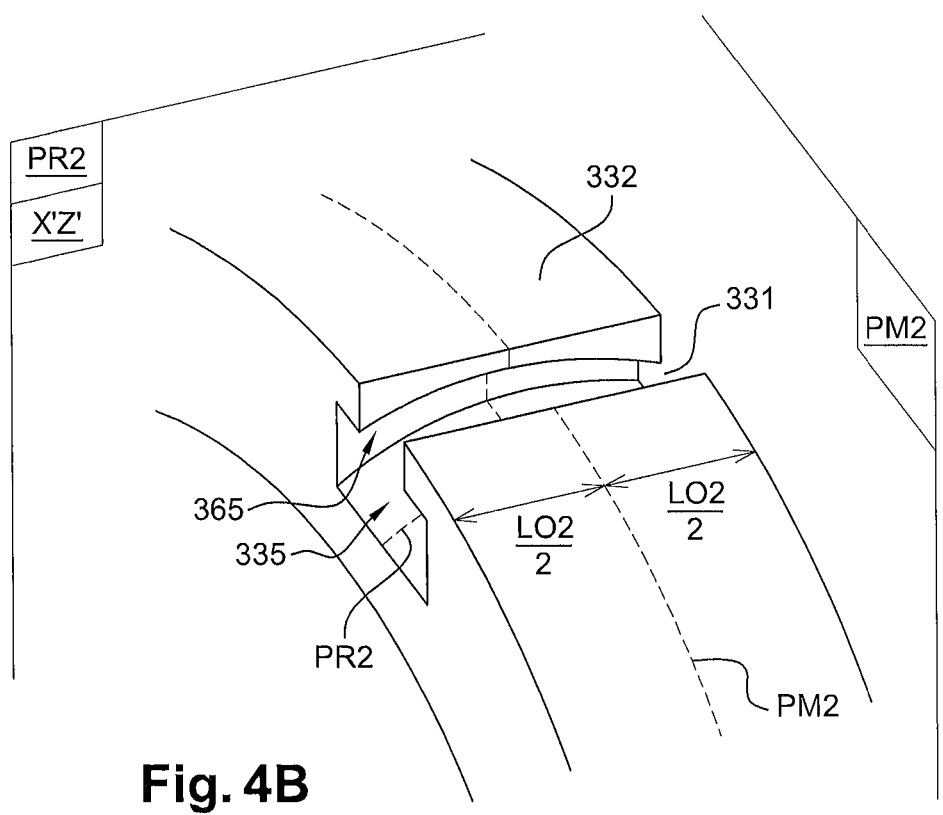
FIG. 4B is a partial schematic perspective view of the disk of FIG. 4A.

FIGS. 4A and 4B represent a rotary fan disk 330 according to one embodiment of the invention. Disk 330 is intended to attach a removable blade assembly of the fan, and has a roughly annular peripheral wall 332. Disk 330 has a plurality of recesses 331 positioned circumferentially in peripheral wall 332. Each recess 331 can receive a removable fan blade attachment. In this embodiment recesses 331 are all identical. In the remainder of the text the aim will therefore be to describe a single recess 331.

When the fan is in operation, disk 330 rotates around an axis of rotation X', which is, for example, the axis of rotation of a low-pressure turbine of the turbojet. Recess 331 has a base of convex shape defining an arc which, in this case, has an axis of symmetry coinciding with a radial axis Z' disk 330 orthogonal to axis of rotation X'. Radial axis Z' is defined as traversing disk 330 as far as half its thickness E.

Recess 331 is curvilinear. It has a first support surface 335 and at least one second support surface 365, the function of which is, in particular, to maintain a curvilinear attachment of a fan blade in recess 341. In this embodiment, first support surface 335 and second support surface 365 both form arcs 336, 366. In this case, first support surface 335 has a convex shape, and second support surface 365 has a concave shape. According to this embodiment, support surfaces 335, 365 have a curvature extending in a direction roughly perpendicular to the direction of curvature of disk 330.

First support surface 335 is the base of recess 331. The latter has an aperture in peripheral wall 332 of disk 330 through which a blade root can pass. Second support surface 355 can include two parts positioned either side of this aperture, as illustrated in FIG. 4B, or a single part positioned on one side or the other of this aperture.

Arcs 336, 366 formed by support surfaces 335, 365 of recess 331 extend in or parallel to a recess plane PR2 passing through the geometrical centre of disk 330, or separated from the geometrical centre by a distance of less than one fifth the outer radius of disk 330. Recess plane PR2 can form an angle with radial plane X'Z' of disk 330, where radial plane X'Z' contains axis of rotation X' of the disk and radial axis Z' of recess 331. This angle is between 0° and 20°, and preferably between 0° and 5°. In the embodiment illustrated in FIGS. 4A and 4B, recess plane PR2 passes through the geometrical centre of disk 330 and forms a zero angle with radial plane X'Z', these two planes therefore being identical.

Each of arcs 336, 366 preferably has a centre of curvature located in a second mid-plane PM2 perpendicular to recess plane PR2 and containing radial axis Z'. In this embodiment, arcs 336, 366 have roughly the same centre of curvature C2. Recess 331 extends along a length LO2 equal to chord LO2 of arc 336 formed by first support surface 335 of recess 331. Mid-plane PM2 passes roughly through the middle of chord LO2 of arc 336.

According to the embodiment represented in FIGS. 4A and 4B, arcs 346, 356 are roughly symmetrical relative to second mid-plane PM2. In addition, recess 331 emerges either side of disk 330, chord LO2 of arc 336 then being equal to thickness E of disk 330.

Figure 5:
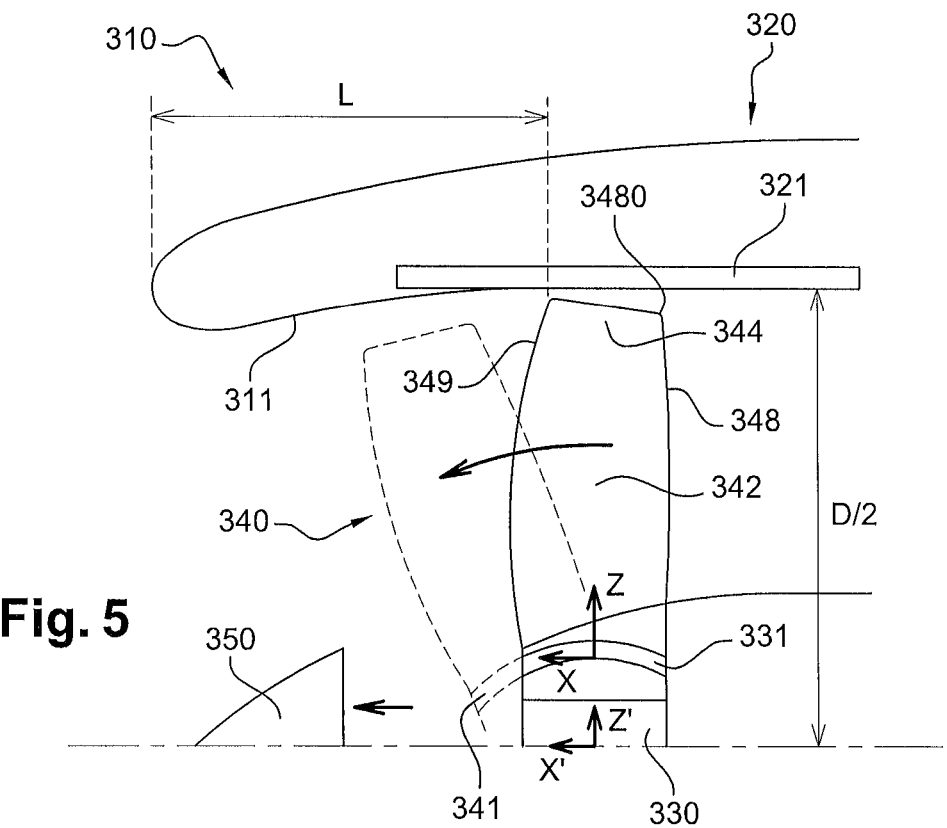
FIG. 5 is a partial schematic longitudinal section view of an embodiment of a turbojet fan according to the invention, where the fan includes the disk of FIG. 4A and a plurality of blades identical to the blade of FIG. 3A.

FIG. 5 is a partial schematic longitudinal section view of a preferential embodiment of a turbojet fan according to the invention. The turbojet is positioned in a nacelle including an upstream air inlet section 310 which is extended in the downstream direction by an intermediate section 320. In the nacelle, an air stream flows from upstream to downstream. Intermediate section 320 includes a fan casing 321 intended to surround the fan.

Air inlet section 310 extends longitudinally over a length L as far as an inlet plane of the fan. The role of air inlet section 310 is, in particular, to decelerate an air stream entering the turbojet. To this end, air inlet section 310 includes an inner wall 311 with a curved shape.

The fan includes disk 330 of FIG. 4A and a plurality of blades identical to blade 340 of FIG. 3A. Blades 340 are positioned radially on periphery 332 of disk 330. In this preferential embodiment, blade axis Z of blade 340 is identical to radial axis Z' of disk 330. In a general manner, since the three-dimensional shape of blade body 342 may be complex, blade axis Z as defined above may form an angle with radial axis Z' which may be as high as some ten degrees.

A curvilinear attachment 341 of a blade 340 is housed in each curvilinear recess 331 of disk 330. First support surface 345 of attachment 341 is supported directly or indirectly on first support surface 335, i.e. base 335, of recess 331. An indirect support may be obtained by a shim positioned between first support surface 345 of attachment 341 and base 335 of recess 331.

Second support surface 355 of attachment 341 preferably closely follows second support surface 365 of recess 331. In other words, arcs 356 and 366 have an identical centre of curvature. In this manner, in operation, the centrifugal forces exerted on a blade 340 in the direction of radial axis Z' of disk 330 pin second support surface 355 of attachment 341 of this blade 340 against corresponding second support surface 365 of recess 331. By this means the forces of blade 340 are distributed over the whole of second support surface 365 of associated recess 341. By this means excessive local concentrations of stresses, which might cause a fracture of recess 341 and/or of blade root 340, are prevented.

In the preferential embodiment of FIG. 5 first mid-plane PM1 of blade 340 and second mid-plane PM2 of disk 330 are identical. Arcs 346, 356 formed by support surfaces 345, 355 of attachment 341, together with arcs 336, 366 formed by support surfaces 335, 365 of recess 331, are symmetrical relative to the same mid-plane. Thus, when the fan is rotating this prevents the appearance of axial forces under the effect of the centrifugal forces exerted on blade 340. Axial forces are forces parallel to axis of rotation X' of disk 330.

Advantageously, a shim is positioned in recess 331 of disk 330 in order to block, in the radial direction, attachment 341 of blade 340 in recess 331 of disk 330. The shim advantageously has a convex surface closely following first support surface 345 (concave) of attachment 341, and a concave surface closely following base 335 (convex) of recess 331.

Trailing edge 348 of blade 340 has one end 3480 in the area of head 344 of the blade. The fan has a diameter D measured between heads 344 of two diametrically opposite blades 340. A cone 350 is positioned upstream from disk 330 of the fan. The role of this cone 350 is, in particular, to hold blades 340 axially in disk 330 of the fan.

The invention is of particular interest when air inlet section 310 of the nacelle is qualified as "short", i.e. when air inlet section 310 has a ratio between its length L and diameter D of the fan of less than 0.6.

As illustrated in FIG. 5, in order to remove blade 340 from the fan, for example to replace it during a maintenance operation, cone 350 is removed beforehand. The shim positioned between attachment 341 and base 335 of recess 331 is then removed. Blade 340 is then moved radially by a relatively small height, permitted by the removal of the shim. This height is, for example, roughly equal to the thickness of the shim. Attachment 341 of blade 340 is then disengaged from recess 331 of disk 330 by a rotary sliding motion of attachment 341 in recess 331.

This rotary motion of attachment 341 is accomplished in recess plane PR2 of associated recess 340. In the preferential embodiment of disk 330, recess plane PR2 extends roughly in the longitudinal direction of axis of rotation X' of disk 330. In a general manner, in all configurations concerned by the present invention, recess plane PR2 forms with this longitudinal axis X' an angle of less than 10°. It will therefore be understood that head 344 of blade 340 essentially pivots in the direction of the aperture of air inlet 310, whilst coming close to the central axis of the air inlet, which coincides with longitudinal axis X'.

By this means, thanks to the invention, head 344 of blade 340 does not come into contact with inner wall 311 of air inlet section 310. Blade 340 can therefore be removed without any need to disassemble air inlet section 310.

However, the curvilinear shape of attachment 341 implies that end 3480 of trailing edge 348 in the area of head 344 of blade 340 comes quite close to casing 321 of the nacelle before moving away from it when attachment 341 is disengaged from recess 331. This may be problematic if the space between head 344 of blade 340 and casing 321 of the nacelle is insufficient to allow blade 340 to pivot without end 3480 of trailing edge 348 abutting with casing 321 of the nacelle.

Figure 6:
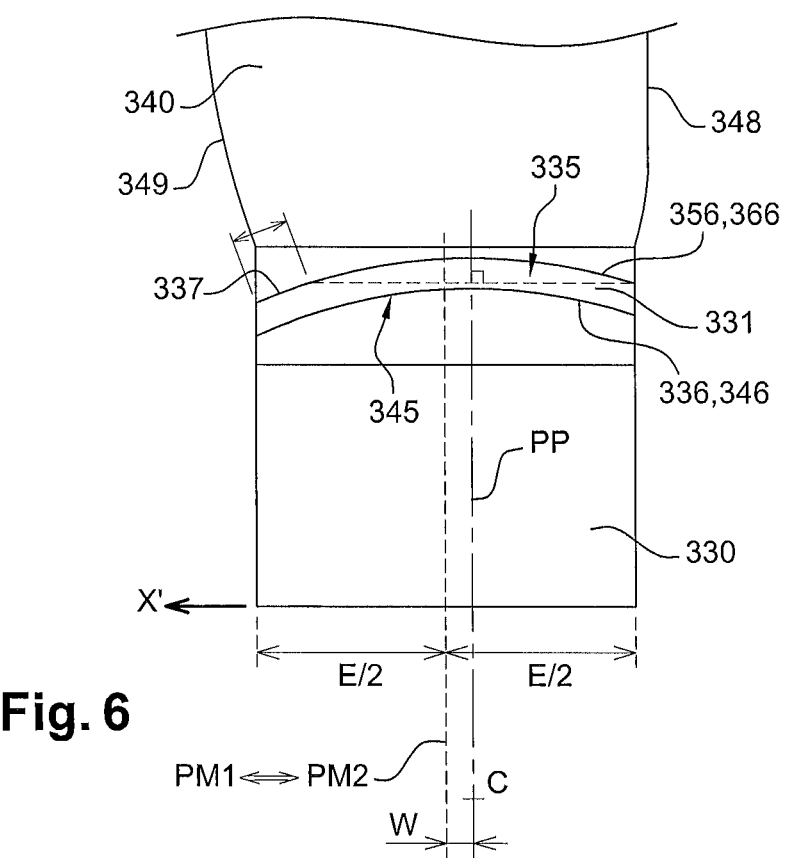
FIG. 6 is a partial schematic longitudinal section view of a variant embodiment of a turbojet fan according to the invention.

FIG. 6 is a partial schematic longitudinal section view of a variant embodiment of a turbojet fan according to the invention. In this variant, centre of curvature C, which is common to all the arcs formed by the support surfaces of the attachment and of the recess, is at a distance W from the first and second mid-planes PM1, PM2, these being, in this case, identical. Centre of curvature C is located, relative to first and second mid-planes PM1, PM2, on the same downstream side as trailing edge 348 of blade 340. Distance W is preferably less than or equal to one quarter of thickness E of disk 330. By this means, the axial forces generated in operation by the support of second support surface 355 of attachment 341 over a portion 337, called "uncompensated portion" 337, of second support surface 365 of recess 331 of disk 330 remain minor.

In the variant embodiment of FIG. 6, when blade 340 is removed, end 3480 of trailing edge 348 passes through a point, called the "upper point", belonging to a parallel plane PP passing through centre of curvature C and parallel to first and second mid-planes PM1, PM2. Since parallel plane PP is closer to trailing edge 348 than first and second mid-planes PM1, PM2, this enables end 3480 of trailing edge 348 to be raised by a smaller amount, making it easier to pass head 344 of blade 340.

By this means, thanks to the invention, it is no longer necessary to remove the air inlet section of the nacelle to remove a blade of the turbojet's fan. Firstly, this enables much time to be gained when removing the blade, which, in addition, is greatly facilitated from a technical standpoint.

The invention is of course not limited to the embodiments described with reference to the figures, and variants could be envisaged without going beyond the scope of the invention. In particular, an attachment can be manufactured where a single support surface forms an arc, and where the other support surface is, for example, rectilinear. In this case the removal of the shim enables the blade to rotate in the recess.

The invention claimed is:

1. A propulsive assembly for an aircraft comprising a nacelle and a turbojet positioned in the nacelle, wherein the nacelle includes an upstream air inlet section, wherein the turbojet includes a fan with removable blades positioned downstream from the upstream air inlet section, wherein the upstream air inlet section extends longitudinally over a length less than 0.6 times a diameter of the fan, wherein the fan includes a rotary disk including a roughly annular peripheral wall and a plurality of curvilinear recesses positioned circumferentially in the peripheral wall, wherein each blade includes a blade body extending between a blade root and a blade head in a blade axis which is roughly radial relative to an axis of rotation of the fan, wherein each blade root includes a curvilinear attachment housed in a respective recess of the rotary disk, the curvilinear attachment having a first face and a second face that is opposite the first face, wherein the recesses are of a shape complementary to that of the curvilinear attachments, wherein each curvilinear attachment has at least two support surfaces that each form an arc having a centre of curvature, wherein a function of the at least two support surfaces is to hold the curvilinear attachment in the recess, wherein each arc of the at least two support surfaces extends in or parallel to an attachment plane containing the blade axis or wherein each arc forms with the blade axis an angle of less than 15°, wherein each one of the at least two support surfaces forms a portion of a cylindrical surface that extends from the first face to the second face of the curvilinear attachment, and wherein an axis of the cylindrical surface is perpendicular to the attachment plane and passes through the centre of curvature of the arcs.

2. The propulsive assembly according the claim 1, wherein the centre of curvature of each arc is located in a first mid-plane perpendicular to the attachment plane and containing the blade axis.

3. The propulsive assembly according to claim 2, wherein each arc is symmetrical relative the first mid-plane.

4. The propulsive assembly according to claim 1, wherein the centre of curvature of each arc is at a distance from a first mid-plane perpendicular to the attachment plane and containing the blade axis, wherein the centre of curvature is located, relative to the first mid-plane, on a same downstream side as a trailing edge of the blade.

5. The propulsive assembly according to claim 1, wherein a first of the at least two support surfaces forms a bottom surface of the blade root.

6. The propulsive assembly according to claim 5, wherein the curvilinear attachment has a third face and a fourth face that is opposite the third face, each of the third face and the fourth face extending from the first face to the second face of the curvilinear attachment, and wherein the first of the at least two support surfaces extends from the third face to the fourth face.

* * * * *